May 26, 1959 E. S. COX ET AL 2,888,302
TURBINE DRIVEN FLUID CIRCULATING UNIT
Filed Sept. 19, 1955 2 Sheets-Sheet 1

EUGENE S. COX,
JOHN W. MEERMANS,
INVENTORS.

BY John H.J. Wallace

EUGENE S. COX,
JOHN W. MEERMANS,
INVENTOR.

BY

United States Patent Office 2,888,302
Patented May 26, 1959

2,888,302

TURBINE DRIVEN FLUID CIRCULATING UNIT

Eugene S. Cox, Palos Verdes Estates, and John W. Meermans, North Hollywood, Calif., assignors to The Garrett Corporation, Los Angeles, Calif., a corporation of California Application September 19, 1955, Serial No. 535,127

11 Claims. (Cl. 308—187)

The present invention relates generally to fluid circulating devices and is more particularly concerned with a compact, light-weight, high-velocity turbine driven unit of the type generally used in aircraft and vehicular air conditioning and refrigeration systems.

The increased demand for higher capacity air conditioning and refrigeration units in modern aircraft, coupled with a strong prohibition against any increase in weight, has necessitated the development of high velocity turbine and fan combinations which far exceed the operational speed for such units in the past. The higher required speeds of operation, in turn, require better aerodynamic design, improved lubrication, and improved cooling means for the necessary shaft bearings.

The principal object of this invention, therefore, is to provide a turbine driven fluid circulating unit having novel means for lubricating its bearings.

Another object is to provide a turbine driven fluid circulating unit which is simple in construction and of such design as to operate efficiently at high speeds with high capacity, and yet be no heavier than similar units of much lower capacity.

A further object is to provide an extremely light-weight, high capacity, turbine driven fluid circulating unit for operation at much higher speeds than used in similar units in the past.

Further objects and advantages of the invention will be brought out in the following specification wherein a detailed description of the invention is given for the purpose of disclosing one embodiment thereof.

Referring to the drawings, which are for illustrative purposes only, and wherein like reference characters denote like parts:

Figure 1:
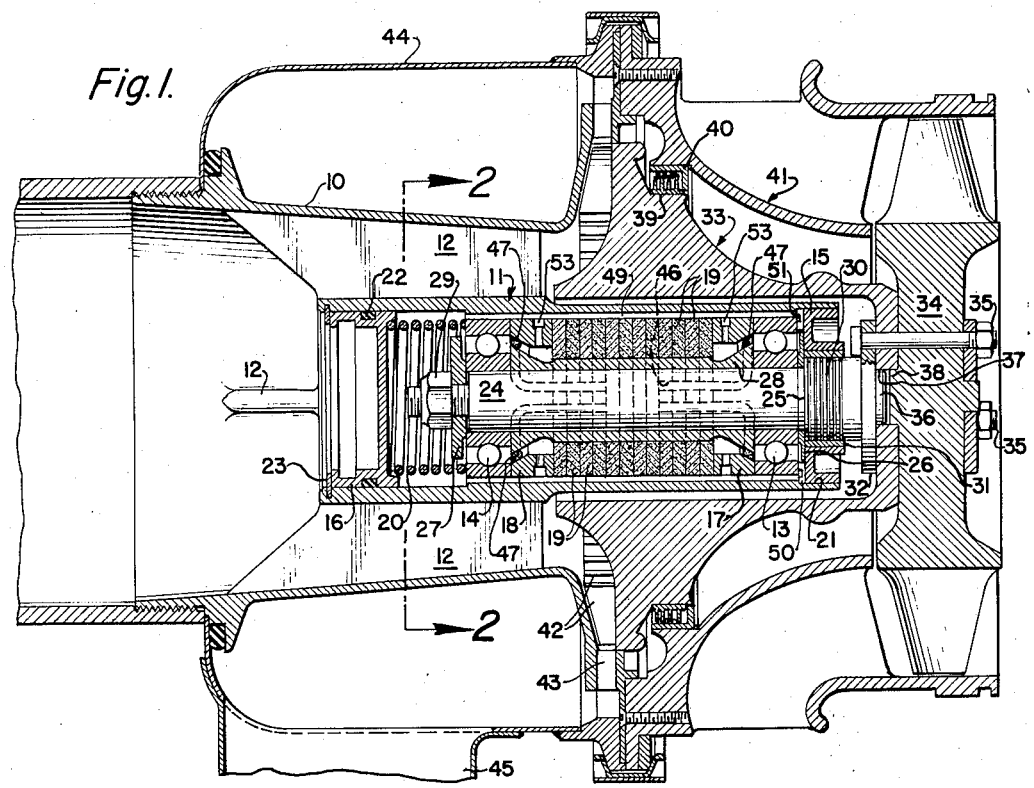
Figure 1 is a longitudinal sectional view of a turbine driven fluid circulating unit embodying the invention.
Figure 2:
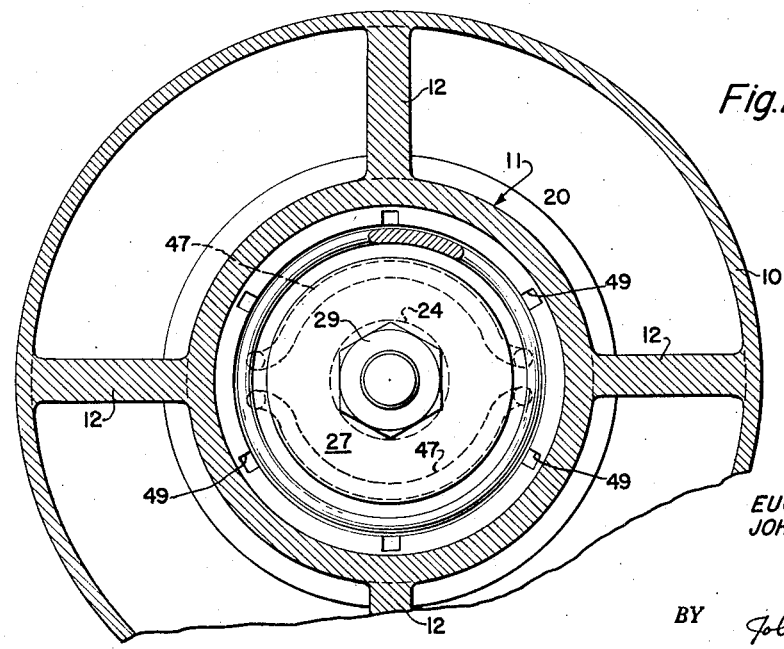
Figure 2 is a partial end elevational view of the turbine end of the unit as taken on line 2—2 of Figure 1.

With reference to Figures 1 and 2, the generally cylindrical turbine shroud is shown at 10. The bearing carrier 11 is mounted concentrically to the turbine shroud 10 by means of vanes or struts 12. These latter parts are brazed or otherwise secured to and between the turbine shroud 10 and bearing carrier 11.

Bearing carrier 11 encases two shaft bearings 13 and 14 which are held in place by end plugs 15 and 16, wick retainers 17 and 18, oil-retaining washers 19, and preloading compression spring 20. End plug 15 may be brazed or otherwise secured in the counterbored end 21 of carrier 11. End plug 16 carries a sealing member 22 and is removably secured in the opposite end of carrier 11 by means of snap ring 23.

Shaft bearings 13 and 14 support shaft 24 having a bearing abutment shoulder 25, oil slingers 26 and 27, a spacer 28, ramped at each end, and a nut 29. The enlarged portion of the shaft 24, extending from the shoulder 25, bears a labyrinth type sealing member 30 which co-operates with the sleeve-like sealing member 31 affixed in the bore of end plug 15. Shaft 24 terminates in a flange 32 bearing the deep-hubbed or bell-shaped turbine wheel 33 and axial fan 34, affixed to the flange 32 by means of a plurality of bolts 35. Shaft 24, turbine wheel 33, and axial fan 34 are assembled in close concentricity by means of the boss 36 centered upon flange 32, the concentric bore 37 of the turbine wheel 33, and the centered boss 38 on the axial fan 34.

Turbine wheel 33 bears a cylindrical back sealing ring member 39 which co-operates with sealing member 40 installed in the interior of fan inlet housing 41. This sealing arrangement prevents the hot and high pressure turbine entry air or fluid from escaping over the back of the turbine wheel and into the fan passages. Turbine wheel 33 carries a plurality of cantilever blades or buckets 42 which receive power fluid from nozzle ring 43. Turbine shroud 10 and nozzle ring 43 are surrounded by a turbine inlet housing 44 having a duct 45 through which the power fluid is introduced.

Figure 3:
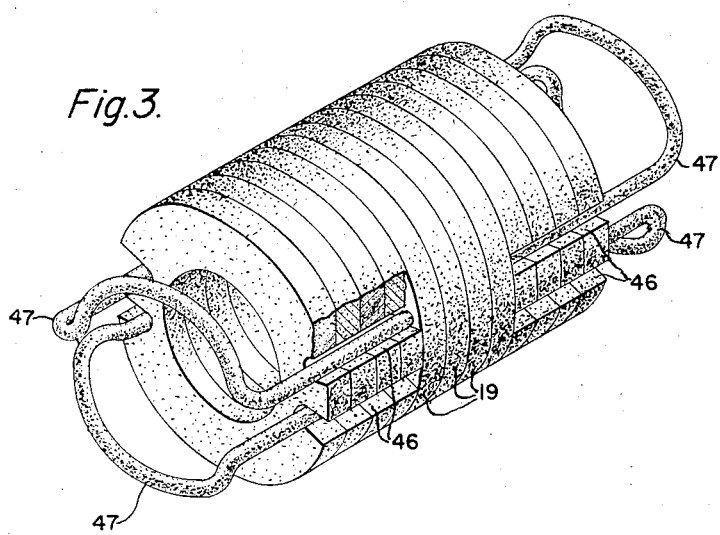
Figure 3 is an isometric view of the improved oil sump showing the wick lubricant distributors.

The improved and weight saving lubrication system which incorporates our invention will now be described in detail. As can be seen from Figure 1, no external oil sump, as common to the prior art, is provided. The oil sump provided is wholly enclosed within the sealed bearing carrier 11 and is comprised of a series of oil retaining washers 19 which are cut from felt or other oil-absorbing material. These washers are assembled so as to surround the ramped spacer 28. As may be noted in Figures 1 and 3, several of the end washers are longitudinally slotted or grooved, as shown at 46, and wicks 47 are inserted therein. These wicks are then led through the channelled apertures 48 of the wick retainers 17 and 18, as shown in Figure 5, and laid over and about the ramps at the ends of the ramped spacer 28, for the purposes as hereinafter disclosed.

Figure 4:
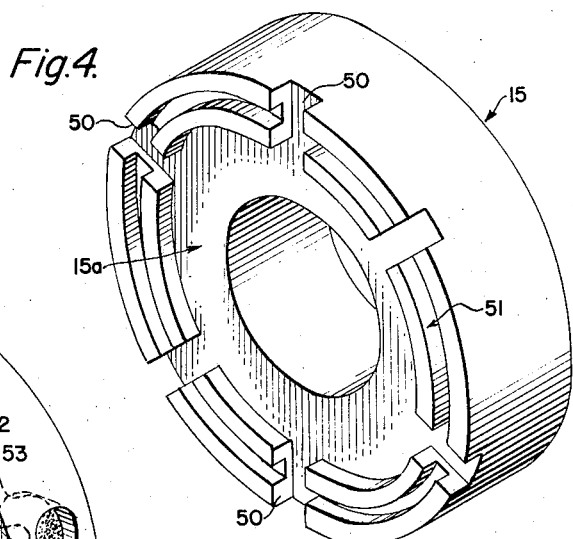
Figure 4 is an isometric view of one of the details of construction.

Other significant features of our improved lubrication system may be found in the configuration of end plug 15 and the internal longitudinal grooves 49 in the bearing carrier 11, as shown in Figures 1, 2, and 4. End plug 15 is grooved or channelled radially, as shown at 50, and concentrically, as shown at 51. Bearing carrier 11 is internally grooved with the same number of grooves as are machined radially in end plug 15. When this plug is inserted and secured into the counterbored end of bearing carrier 11, its radial grooves are carefully matched to correspond with the internal, longitudinal grooves in the bearing carrier. End plug 15 is counterbored, as at 15a, for the purpose of housing slinger 26.

Figure 5:
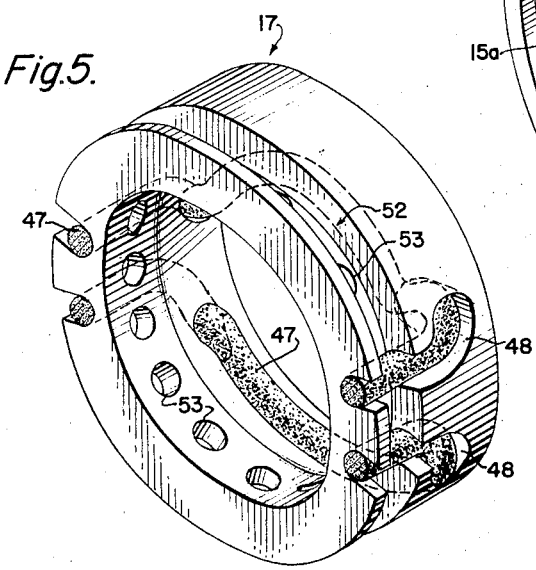
Figure 5 is an isometric view of another constructional detail.

Wick retainers 17 and 18 are shown in Figure 5. These retainers may be of metal, plastic, or suitably rigid material. One of their principal functions is to compressively hold oil retaining washers 19 in place. Channels or apertures 48 have been previously described as being provided to lead the wicks 47 on to the inclined ramps of the ramp spacer 28. Peripheral groove 52 and radial holes 53 connecting therewith are provided for a purpose shortly to be explained.

The operation of our improved, weight and space saving lubrication system may now be described. The oil soaked washers 19 and wicks 47, forming the internal oil sump, are assembled with the wick retainers 17 and 18 into the bearing carrier 11. The oil contained in these washers then feeds by capillary action through the wicks on to the inclined ramps of the ramped spacer 28 and is thrown outwardly through the races of the shaft bearings 13 and 14 in the form of a pervading mist, effectively lubricating these high speed bearings. The oil slingers 26 and 27 not only promote the flow of the oil mist through the bearings, but also act to pump the oil back to the sump. This function of the slingers is performed differently at the opposite ends of the bearing carrier 11. At the preloading spring end of the carrier, the bore of the carrier is tightly sealed and no concern is felt as to the possible escape of any oil out of the carrier enclosed sump space. The oil mist coming through the bearing 14 is slung outwardly and returns to the oil absorbing washers 19 by means of the longitudinal grooves 49 in the carrier. Any oil collecting in these grooves before it reaches the washers may drain into peripheral grooves 52 of the wick retainer 18, through the radial holes 53 back onto its corresponding inclined ramp of the ramped spacer 28. This cycle is then repeated as long as the shaft 24 and ramped spacer 28 continue to rotate at a speed sufficient to create the oil mist. At the other end of the carrier 11, there is a definite possibility that oil might escape through the labyrinth seal 30, 31. In order to prevent this loss of oil, the particular construction of end plug 15, as previously described, is provided. Here, the oil mist is thrown into and through bearing 13 by means of the inclined ramp of the ramped spacer 28. Slinger 26 then throws the oil mist outwardly through the radial grooves 50 in the wick retainer 17 and it is returned to the oil absorbing washers 19 by the longitudinal grooves 49. Again, any oil collecting in the grooves 49 before it reaches the oil absorbing washers may be returned to the corresponding inclined ramp by means of peripheral groove 52 and radial holes 53 in wick retainer 17. If any oil collects on the inward face of end plug 15, it will pass into concentric groove 51 and drain through the lower radial grooves 50 into the lower longitudinal grooves 49 through which it is returned to the oil absorbing washers 19.

While we have described our light-weight, space-saving and improved lubricating system in connection with a small, high speed, high capacity turbine driven fluid circulating unit, it will be apparent that our improved lubricating system may be used wherever a high speed shaft is supported by anti-friction bearings which, in turn, are enclosed in a sealed bearing carrier.

Having thus described our invention, we claim:

1. A low-loss lubricating system for high-speed, anti-friction bearing supported rotating shafts comprising a casing sealed at one end; an apertured end plug in the other end of said casing; a plurality of anti-friction bearings secured in said casing; a central shaft supported by said bearings and protruding through said end plug; co-operating sealing means carried by said shaft and said end plug; an oil sump consisting of an annular body of oil-absorbent material surrounding said shaft and secured between said bearings; a spacer carried by said shaft between the inner races of said bearings and capable of rotation therewith; inclined ramps on said spacer adjacent said bearings; wick means for feeding oil from said oil sump to the inclined ramps of said spacer, oil slinger means carried by said shaft outwardly of said bearings; longitudinal grooves in the inner surface of said casing; and radial grooves in said end plug adjacent to one of said slingers; said end plug radial grooves matching with said longitudinal grooves in the inner surface of said casing.

2. In high speed rotating machinery, a self-lubricating shaft and bearing assembly comprising: a casing; bearing means carried by said casing; a shaft supported for rotation by said bearing means; an oil sump comprising a body of oil-soaked, oil-absorbent material disposed wholly within said casing between said bearing means and surrounding said shaft; ramp means on said shaft adjacent the inner sides of said bearing means; wick means extending from said oil-absorbent material to said ramp means, said wick means serving to conduct oil from the absorbent material to said ramp means, centrifugal force causing an oil mist to be thrown from said ramps upon high speed rotation of said shaft; and means on said shaft at the outer sides of said bearing means for circulating said oil mist through said bearing means and returning the same to said oil-absorbent material.

3. In high speed rotating machinery, a self-lubricating shaft and bearing assembly comprising: a casing; bearing means carried by said casing; a shaft supported for rotation by said bearing means; an oil sump comprising a body of oil-soaked, oil-absorbent material disposed wholly within said casing between said bearing means and surrounding said shaft; ramp means on said shaft adjacent the inner sides of said bearing means; wick means extending from said oil-absorbent material to said ramp means, said wick means serving to conduct oil from the absorbent material to said ramp means, centrifugal force causing an oil mist to be thrown from said ramps upon high speed rotation of said shaft; slinger means on said shaft at the outer sides of said bearing means, said slinger means being responsive to high speed rotation of said shaft to draw said oil mist through said bearing means; and grooves in the inner side of said casing to conduct the oil mist from said slinger means back to said oil-absorbent material.

4. In high speed rotating machinery, a self-lubricating shaft and bearing assembly comprising: a casing; bearing means carried by said casing; a shaft supported for rotation by said bearing means; an oil sump comprising a series of oil-soaked, oil-absorbent washers assembled in said casing between said bearing means and surrounding said shaft; ramp means on said shaft adjacent the inner sides of said bearing means; wick means extending from said washers to and engaging said ramp means, rotation of said shaft causing oil conducted from said washers to said ramp means to form an oil mist; slinger means on said shaft at the outer sides of said bearing means, rotation of said shaft causing said slinger means to draw said oil mist through said bearing means; means at the outer side of at least one of said slinger means to collect oil discharged by such slinger; and passage means in said casing for receiving oil from said slinger and said collector means and conducting the same back to said washers.

5. In high speed rotating machinery, a self-lubricating shaft and bearing assembly comprising: a casing; bearing means carried by said casing; a shaft supported for rotation by said bearing means; an oil sump comprising a series of oil-soaked, oil-absorbent washers assembled in said casing between said bearing means and surrounding said shaft; ramp means on said shaft adjacent the inner sides of said bearing means; wick means extending from said washers to and engaging said ramp means, rotation of said shaft causing oil conducted from said washers to said ramp means to form an oil mist; slinger means on said shaft at the outer sides of said bearing means, rotation of said shaft causing said slinger means to draw said oil mist through said bearing means; an end plug in said housing at the outer side of at least one of said slinger means; said end plug being recessed to enclose the adjacent slinger means and formed with radially extending oil conducting grooves; and longitudinally extending grooves provided in said casing to communicate with the radial grooves in said end plug and conduct oil therefrom to said absorbent washers.

6. In high speed rotating machinery, a self-lubricating shaft and bearing assembly comprising: a casing; bearing means carried by said casing; a shaft supported for rotation by said bearing means; an annular body of oil-absorbent material disposed in said casing between said bearing means and surrounding said shaft; ramp means on said shaft adjacent the inner sides of said bearing means; wick means extending from said oil-absorbent material toward said bearing means; rigid annular wick retainers disposed in said housing between said oil-absorbent material and said bearing means, each of said wick retainers having recesses for receiving said wicks and holding the same in engagement with said ramp means, rotation of said shaft causing oil conducted to said ramp means by said wicks to be thrown outwardly in the form of an oil mist; slinger means on said shaft at the outer sides of said bearing means; and passage means formed in said casing and wick retainers to conduct oil mist from said slinger means to said oil-absorbent material and said ramp means at the inner sides of wicks held thereagainst by said retainers.

7. In high speed rotating machinery, a self-lubricating shaft and bearing assembly comprising: a casing; bearing means carried by said casing; a shaft supported for rotation by said bearing means; an annular body of oil-absorbent material disposed in said casing between said bearing means and surrounding said shaft; ramp means on said shaft adjacent the inner sides of said bearing means; wick means extending from said oil-absorbent material toward said bearing means; rigid annular wick retainers disposed in said housing in registration with said ramp means, said wick retainers having recesses for receiving said wicks and holding portions thereof in engagement with said ramp means, each of said retainers having an external annular groove and ports extending inwardly therefrom at the inner side of the portion of the wick engaging said ramp; said ramp means serving to throw oil conducted thereto by said wicks outwardly in the form of oil mist upon high speed rotation of said shaft; slinger means on said shaft at the outer sides of said bearing means, said slinger means serving to draw said oil mist through said bearing means and redirect it in a radial direction; and passage means provided in said casing to conduct oil mist from said slinger means to said oil-absorbent material and the annular grooves in said retainers.

8. Oil retaining and conducting means for a self-lubricating shaft and bearing assembly comprising: a series of annular elements of oil-absorbent material and a pair of rope-like wicks projecting from each end of the series of annular elements, the ends of the wicks being disposed in said series of elements on opposite sides of the axis thereof, the intermediate portions of said wicks being disposed beyond the ends of said series of elements to be partially looped around and held in engagement with opposed sides of mist creating means on a shaft when the latter is extended through said series of elements.

9. Oil retaining and conducting means for a self-lubricating shaft and bearing assembly comprising: a series of annular elements of oil-absorbent material and a pair of rope-like wicks projecting from each end of the series of annular elements, the peripheries of certain of said annular elements being notched on opposite sides to receive the ends of said wicks, the intermediate portion thereof being disposed beyond the ends of said series of elements to be partially looped around and held in engagement with opposed sides of mist creating means on a shaft when the latter is extended through said series of elements.

10. In high speed rotating machinery, a self-lubricating shaft and bearing assembly comprising: a casing; bearing means carried by said casing; a shaft supported for rotation by said bearing means, said shaft having ramp means adjacent one side of said bearing means; an oil sump comprising a series of oil-soaked, oil-absorbent washers assembled in said casing between said bearing means and surrounding said shaft; and wick means extending from said washers to said ramp means, rotation of said shaft causing oil conducted from said washers to said ramp means to form an oil mist adjacent said bearing means.

11. In high speed rotating machinery, a self-lubrication shaft and bearing assembly comprising: a casing; bearing means carried by said casing; a shaft supported for rotation by said bearing means, said shaft having ramp means adjacent the inner side of said bearing means; an annular body of oil-absorbent material disposed in said casing between said bearing means and surrounding said shaft; retainer means including resilient means for compressing said oil-absorbent material; wick means extending from said oil-absorbent material to said ramp means, said wick means serving to conduct oil from the absorbent material to said ramp means, and centrifugal force causing an oil mist to be thrown from said ramp means adjacent said bearing means upon high speed rotation of said shaft; and means on said shaft on the other side of said bearing means for circulating said mist through said bearing means and returning it to said oil-absorbent material.

References Cited in the file of this patent

UNITED STATES PATENTS

| | | |
|---|---|---|
| 1,180,879 | Pyle | Apr. 25, 1916 |
| 1,890,844 | Delaval-Crow | Dec. 13, 1932 |
| 2,159,422 | Buchi | May 22, 1939 |
| 2,188,251 | Nelson | Jan. 23, 1940 |
| 2,326,161 | Nelson | Aug. 10, 1943 |
| 2,364,189 | Buchi | Dec. 5, 1944 |
| 2,703,674 | Wood | Mar. 8, 1955 |

FOREIGN PATENTS

| | | |
|---|---|---|
| 695,275 | Great Britain | Aug. 5, 1953 |